US010697137B2

(12) United States Patent
Hernández Espina et al.

(10) Patent No.: US 10,697,137 B2
(45) Date of Patent: Jun. 30, 2020

(54) CANOPY OF A PASSENGER BOARDING BRIDGE

(71) Applicants: thyssenkrupp Airport Solutions, S.A., Mieres (ES); thyssenkrupp AG, Essen (DE)

(72) Inventors: Manuel Hernández Espina, Pruvia (ES); Jose Ramón Busto Fernández, Gijón (ES); Antonio Murias Bermejo, Gijón (ES); Jose Fermín Vigil Fernández, Oviedo (ES)

(73) Assignees: THYSSENKRUPP AIRPORT SOLUTIONS, S.A., Mieres (ES); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/604,250

(22) PCT Filed: Apr. 6, 2018

(86) PCT No.: PCT/EP2018/058864
§ 371 (c)(1),
(2) Date: Oct. 10, 2019

(87) PCT Pub. No.: WO2018/189053
PCT Pub. Date: Oct. 18, 2018

(65) Prior Publication Data
US 2020/0149233 A1 May 14, 2020

(30) Foreign Application Priority Data
Apr. 10, 2017 (EP) .................................... 17380011

(51) Int. Cl.
*E01D 15/00* (2006.01)
*E01D 15/24* (2006.01)
*B64F 1/305* (2006.01)

(52) U.S. Cl.
CPC .............. *E01D 15/24* (2013.01); *B64F 1/305* (2013.01); *E01D 15/005* (2013.01)

(58) Field of Classification Search
CPC ....... E01D 15/005; E01D 15/24; B64F 1/305; B64F 1/3055
(Continued)

(56) References Cited

U.S. PATENT DOCUMENTS 3,363,273 A * 1/1968 Chitwood ............ B65G 69/008
14/71.7
3,581,331 A * 6/1971 Fisher et al. .......... B64F 1/3055
14/71.5
(Continued)

FOREIGN PATENT DOCUMENTS

DE 33 11 754 A 10/1983
EP 30 23 885 A 1/1982
EP 2 803 587 A 11/2014

OTHER PUBLICATIONS

English Translation of International Search Report issued in PCT/EP2018/058864, dated May 29, 2018.
(Continued)

*Primary Examiner* — Raymond W Addie
(74) *Attorney, Agent, or Firm* — thyssenkrupp North America, LLC

(57) ABSTRACT

A canopy for a passenger boarding bridge, includes a fixed frame, a flexible frame configured to align to a fuselage of a plane or a ship, a bellow roof clamped between the fixed frame and the flexible frame, and a suspension system. The suspension system includes a first cylinder actuator, and a second cylinder actuator, wherein the first cylinder actuator is configured to provide a pushing force in a first pushing direction and the second cylinder actuator is configured to provide a pushing force in a second pushing direction, wherein the first cylinder actuator and the second cylinder
(Continued)

actuator are connected in series and the first pushing direction is opposite to the second pushing direction.

9 Claims, 4 Drawing Sheets

(58) Field of Classification Search
USPC .......................................................... 14/71.5
See application file for complete search history.

(56) References Cited

U.S. PATENT DOCUMENTS

| 3,588,934 | A | * | 6/1971 | Van Marle | ............... | B64F 1/305 |
| | | | | | | 14/71.5 |
| 3,639,934 | A | * | 2/1972 | Eggert, Jr. | ............... | B64F 1/305 |
| | | | | | | 14/71.5 |
| 3,641,604 | A | * | 2/1972 | Eggert, Jr. | ............ | B64F 1/3055 |
| | | | | | | 14/71.5 |
| 3,843,987 | A | * | 10/1974 | Lodjic | ..................... | B64F 1/305 |
| | | | | | | 14/71.5 |
| 4,120,067 | A | | 10/1978 | Hone | | |
| 4,333,195 | A | * | 6/1982 | Lichti | ..................... | B64F 1/305 |
| | | | | | | 138/118 |
| 4,817,223 | A | | 4/1989 | Koch | | |
| 8,104,129 | B2 | * | 1/2012 | Tang | ...................... | B64F 1/305 |
| | | | | | | 14/71.5 |

OTHER PUBLICATIONS

EN 12312-4:2014 E—European Standard, Aircraft ground support equipment—Specific requirements—Part 4: Passenger boarding bridges, (Mar. 2014), pp. 1-25.

English translation of UNE-EN 1915-2—Land Equipment for airplanes Part 2: Stability and resistance requirement, calculations and test methods, (Oct. 2001), pp. 1-30.

English translation of Directive 2006/42/EC of the European Parliament and of the Council, (May 17, 2006), pp. 1-69.

* cited by examiner

CANOPY OF A PASSENGER BOARDING BRIDGE

CROSS REFERENCE TO RELATED APPLICATIONS

This application is a U.S. National Stage Entry of International Patent Application Serial Number PCT/EP2018/058864, filed Apr. 6, 2018, which claims priority to European Patent Application No. EP 17380011.1, filed Apr. 10, 2017, the entire contents of both of which are incorporated herein by reference.

FIELD

The present disclosure generally relates to a canopy of a passenger boarding bridge.

BACKGROUND

A passenger boarding bridge (PBB) connects an airplane with a terminal building via a tunnel. The tunnel may be extendible and in particular comprises at least two tunnel sections, which can be telescoped for adjusting the length of the tunnel to the distance between an airplane door and the terminal building. The tunnel is movably supported by a drive unit, which can be mounted below a lift system. The lift unit is used to adjust the height of the tunnel so that the end of the tunnel facing the airplane is aligned to the door of the airplane. At the end of the tunnel facing the airplane a cabin is located, which constitutes the airplane side area of the boarding bridge. A movable canopy constitutes a housing of the cabin, which is adaptable to the shape of the airplane fuselage.

EP 2 803 587 A1, FIG. 1 of which is shown as FIG. 1 in this application, discloses a passenger boarding bridge having a canopy 10. The canopy 10 comprises a bellow roof (not shown), terminating in a plane facing flexible frame 6 having an upper bumper 8 at the upper area of the flexible frame 6. During operation the shape of the canopy 10 is to be adjusted to the shape of the fuselage of the airplane in the area, where the PBB is connected to the fuselage.

FIG. 2 shows schematically a cross-section of the fuselage 1 of an Airbus A380. The upper PBB $2_U$ is docked to a door in the second floor of the A380; the lower PBB $2_U$ is docked to a door in the first floor of the A380. Due to the inclination of the fuselage in the second floor the canopy requires an increased range of operation, compared to a usual passenger boarding bridge. In particular, a large lateral shifting range X of the upper passenger boarding bridge is required.

Therefore in the canopy shown in EP 2 803 587 A1 the shape of the frame can be adjusted to the shape of the airplane fuselage 1 by a complex suspension system on each side of the canopy, each comprising several levers 14a-d and two actuating cylinders 16. The kinematics of the levers 14a-d enables that the lateral shifting range X is larger than the range of operation of the cylinder upper cylinder $16_U$. The lower cylinder $16_L$ is provided to support the levers in a vertical direction.

Thus a need exists for an improved canopy, in particular comprising a simplified suspension system, and providing a comparable or increased range of operation with respect to conventional solutions.

DETAILED DESCRIPTION

Figure 1:
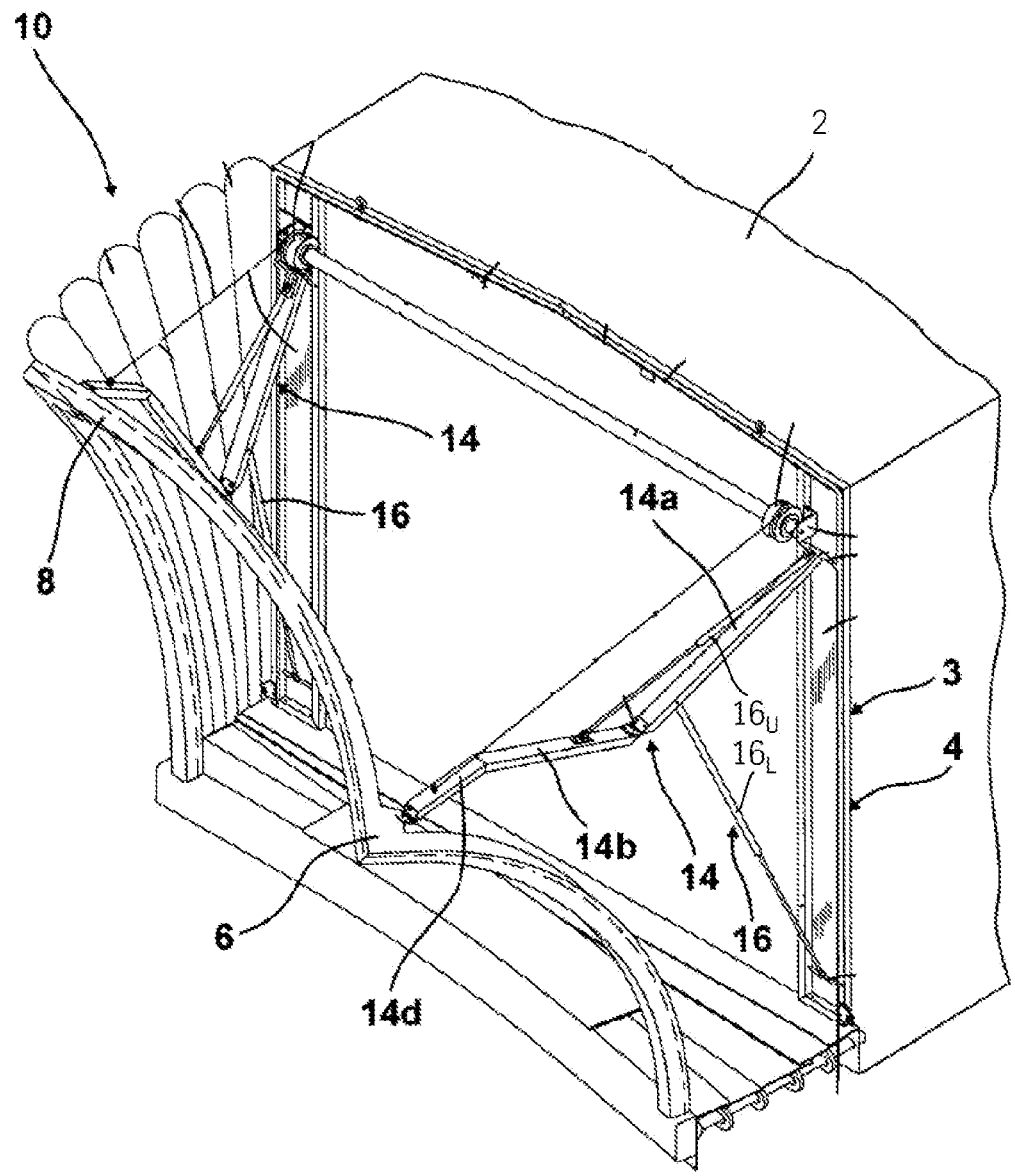
FIG. 1 is a canopy according to the prior art.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention refers to a canopy of a passenger boarding bridge, in particular for boarding a ship or an airplane.

The inventive canopy has the advantages that it provides a large range of operation, in particular a large lateral shifting range, with small amount of parts and a simple structure.

In an embodiment the first cylinder actuator is arranged between the fixed frame and the second cylinder actuator, and the second cylinder actuator is arranged between the first cylinder actuator and the flexible frame.

In an embodiment the first cylinder actuator and the second cylinder actuator are fixedly connected to each other by a common frame. In particular the common frame has a main extension direction with a length along a mean pushing direction. In particular the common frame may be a closed housing, which covers movable parts of the cylinder actuators for preventing in particular injuries.

In an embodiment the first cylinder actuator has a first cylinder and a first rod and the second cylinder actuator has a second cylinder and a second rod wherein each rod is being transferable between an extracted state and a retracted state.

Thereby the first rod and the second rod may both be fixed at a respective frame side end at the common frame, in particular within the closed housing.

In an embodiment in a, in particular fully, extracted state of the cylinders actuators the cylinder is at least partially accommodated within the common frame, namely the closed housing. So the risk of injuries caused by a cylinder moving into and out of the housing is reduced.

In an embodiment the first cylinder actuator and the second cylinder actuator are arranged parallel to each other.

In this regard the canopy may comprise one suspension system for the left side of the canopy and one suspension system on the right side of the canopy. The present description refers to only one suspension system, however it is to be understood that the description is applicable to any second or third suspension system.

Figure 2:
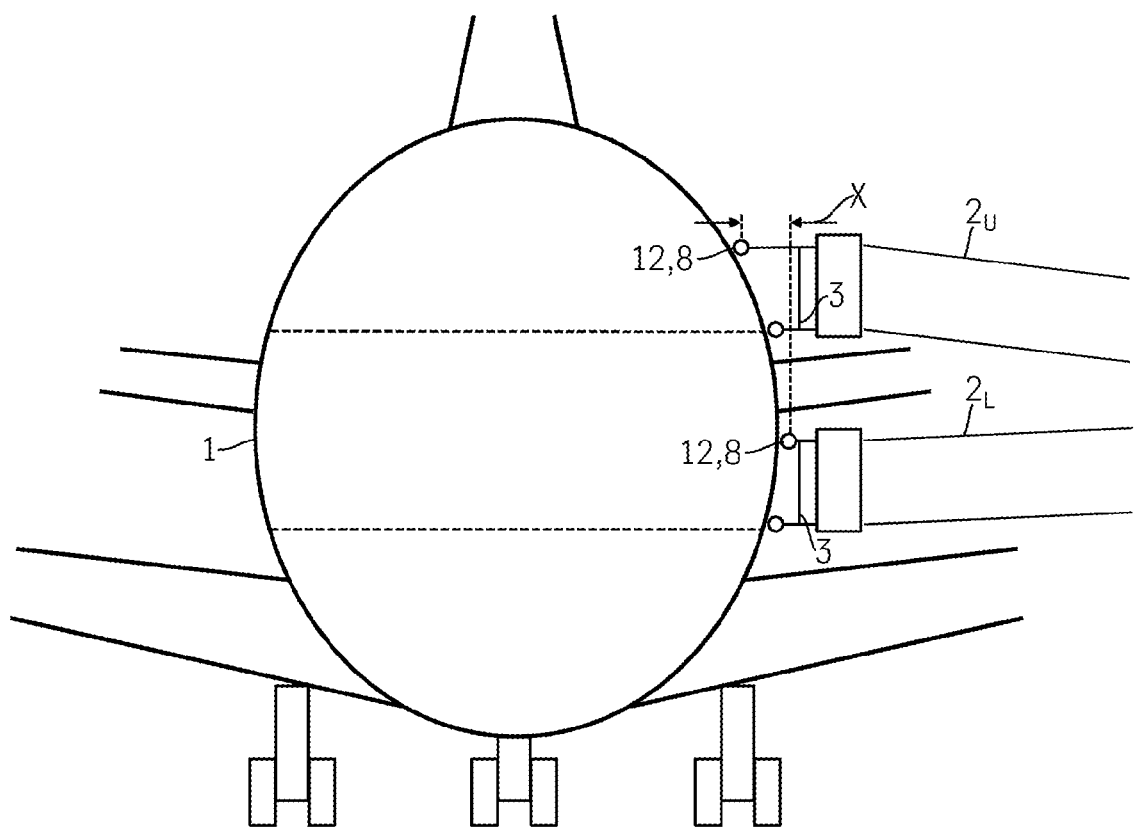
FIG. 2 is a schematic view of a fuselage of an A380 with two passenger boarding bridges connected.
Figure 3:
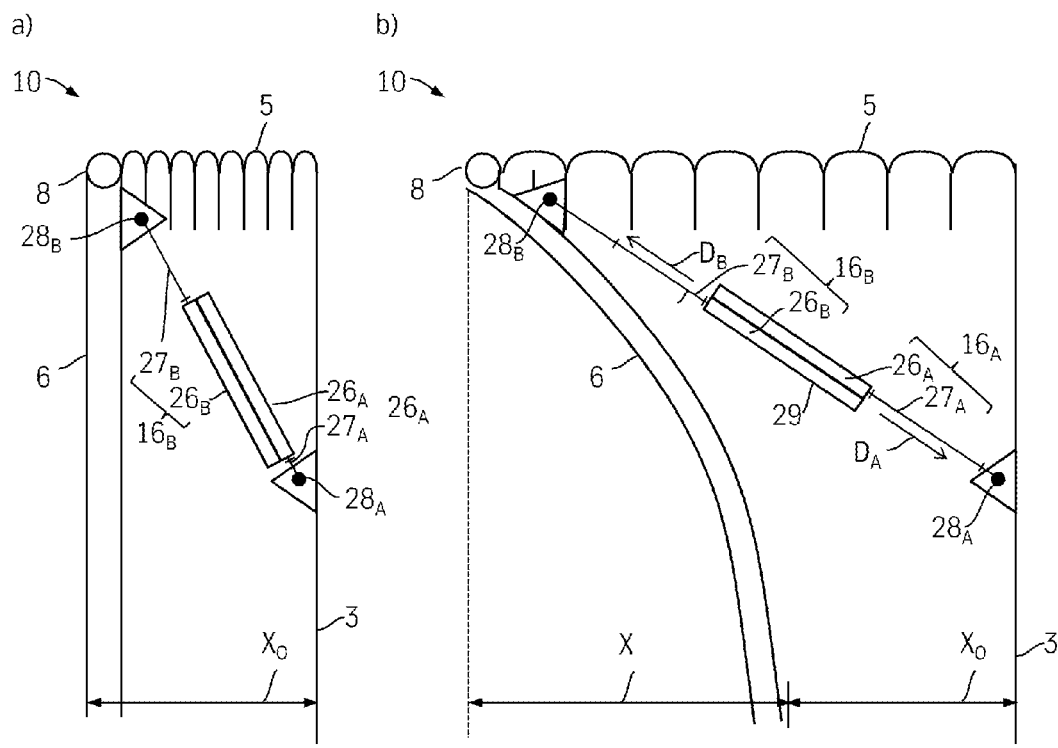
FIG. 3 is an inside view of an inventive canopy in two operational states having a suspension system in a first aspect.

FIG. 3 shows an inventive canopy 10. The canopy 10 comprising a bellow roof 5, terminating in a plane facing flexible frame 6 having an upper bumper 8 at the upper area of the flexible frame 6. During operation the shape of the canopy 10 can be adjusted to the shape of the fuselage of the airplane in the area, where the PBB is connected to the fuselage. In FIG. 3a the canopy is shown in an undocked stated, in FIG. 3b the canopy 10 is shown in a deformed state, in which the flexible frame 6 if adapted to the shape of a plane fuselage, comparable to the situation in FIG. 2.

The term "flexible frame" does not require a flexibility of certain parts; it is rather to be understood as describing the fuselage facing side of the canopy, which has the ability to change its overall shape in a certain amount to follow the shape of the fuselage as a consequence of the operation of the cylinders 26. Therefore the suspension system has cylinders 16 as actuators for changing the shape of the canopy.

The suspension system of the flexible frame comprises two cylinders actuators $16_A$, $16_B$ fixedly coupled to each other.

To each cylinder actuator $16_A$, $16_B$ a rod $27_A$, $27_B$ and a cylinder $26_A$, $26_B$ is allocated. The first cylinder $26_A$ can push the first rod $27_A$ in a first pushing direction $D_A$, the second cylinder $26_B$ can push the second rod $27_B$ in a second pushing direction $D_B$.

In the embodiment shown in FIG. 1 the first rod $27_A$ is arranged between a fixed frame 3 and the first cylinder $26_A$. The second rod $27_B$ is arranged between the flexible frame 6 and the second cylinder $26_B$. A first fixation joint $28_A$ of the first rod $27_A$ to the fixed frame 3 is located vertically below than a fixation point $28_B$ of the second rod $27_B$ to the flexible frame 6. Thus the rods 27 and the cylinders 16 are capable to provide a vertical supporting force component to the flexible frame 6.

Figure 4:
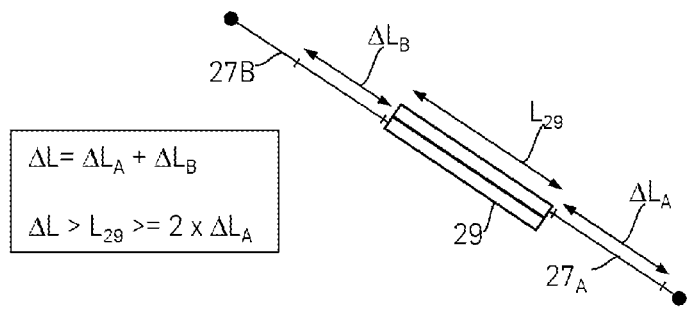
FIG. 4 is an exploded view of the suspension system of the canopy according to FIG. 3.

The cylinder actuators 16 are located parallel to each other as illustrated in FIG. 4, but are connected in series. Thereby the suspension system is capable to increase its overall length nearly by the double of the length of one cylinder. In the retracted state (the rods are retracted as far as possible into the cylinders) the suspension has in main the length $L_{29}$ of one cylinder. In the extracted state the rods can be shifted out of the cylinders by $\Delta L_A$ and $\Delta L_B$, each of which is nearly the length $L_{29}$ of one cylinder 16. In sum the overall extraction length $\Delta L$ is ($\Delta L_A + \Delta L_B$). So in sum, the in optimized solution may be capable of nearly triplicating the length of the cylinder. With the term "suspension" is meant the arrangement of all rods 27 and cylinders 16.

Figure 5:
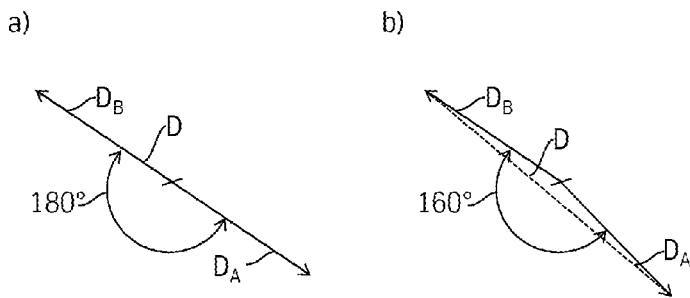
FIG. 5 is a schematic view of some suitable opposite pushing directions.

The cylinders $26_A$ and $26_B$ push the respective rods $27_A$, $27_B$ in directions opposite to each other. The term "opposite" comprises and exact opposite direction of 180° (FIG. 5a) as well as deviations from the exact opposite direction (shown in FIG. 5b) within a limited scope.

Figure 6:
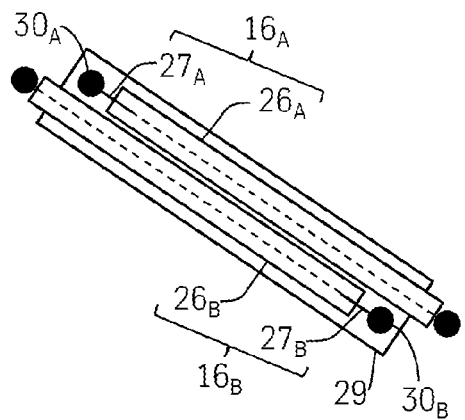
FIG. 6 is a schematic view of a suspension system in a second aspect suitable for the canopy of FIG. 3.
Figure 6:
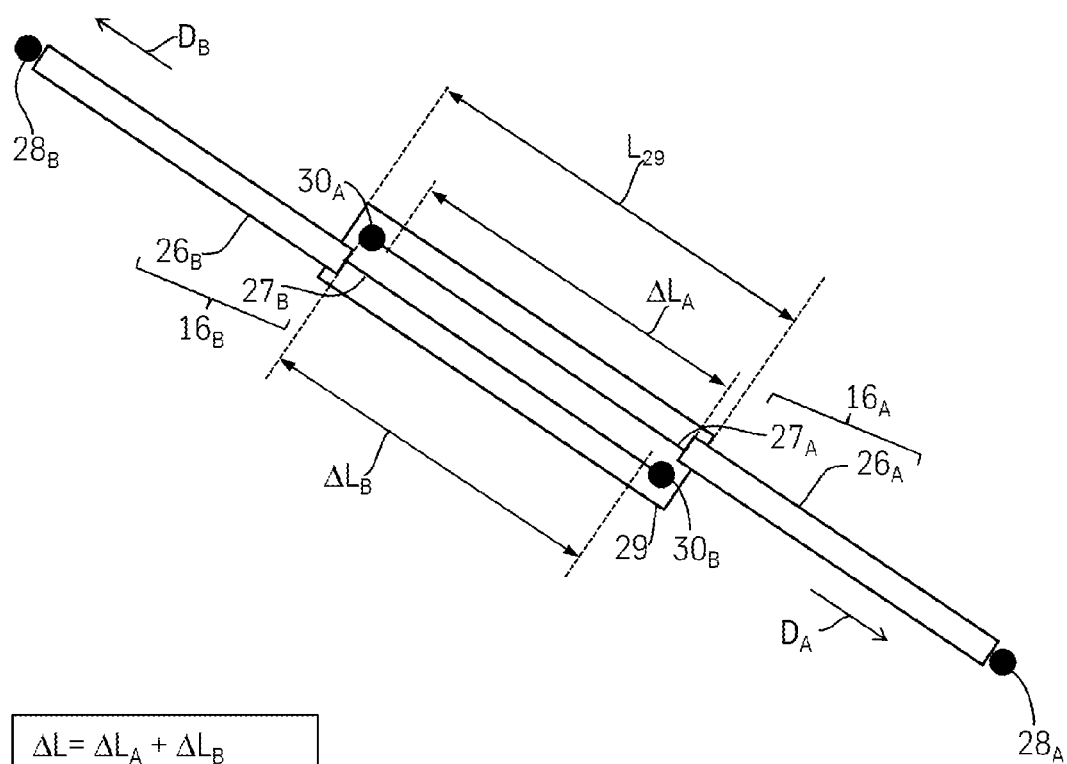

FIG. 6 shows an alternative embodiment of the suspension. Compared to the embodiment of FIG. 3 the cylinders actuators 16 are arranged inverted. That means that both rods $27_A$, $27_B$ are connected to each other by the common frame 29. The respective cylinders $16_A$, $16_B$ each are connected to the fixed frame 3 or the flexible frame 6 via the respective fixing points $28_A$, $28_B$.

FIG. 6a shows the cylinders actuators 16 in the retracted state. Thereby the cylinders 26 are nearly fully accommodated within the common frame 29, which in this case is designed as a closed housing. In the fully extracted state, shown in FIG. 6b, the cylinders are still accommodated within the housing at a small amount. So here the cylinder does not completely leave the housing 29. That means in reverse that during retraction the no end of the cylinder does enter the housing, which could bear a dangerous shear effect for fingers of passengers. The risk of injuries caused is thus reduced. The geometrical advantages described with reference to FIG. 4 are maintained.

LIST OF REFERENCE SIGNS 1 fuselage
2 passenger boarding bridge
3 fixed frame
5 bellow roof
6 flexible frame
8 upper bumper
10 canopy
14 lever
16 cylinder actuator
26 cylinder
27 rod
28 fixing joint
29 common frame/closed housing
30 frame side end
30 frame side end of cylinder actuator
D pushing direction
X lateral shifting range
L Length

What is claimed is:

1. A canopy for a passenger boarding bridge, comprising:
a fixed frame,
a flexible frame configured to align to a fuselage of a plane or a ship,
a bellow roof clamped between the fixed frame and the flexible frame, and
a suspension system, comprising:
a first cylinder actuator, and
a second cylinder actuator,
wherein the first cylinder actuator is configured to provide a pushing force in a first pushing direction and the second cylinder actuator is configured to provide a pushing force in a second pushing direction,
wherein the first cylinder actuator and the second cylinder actuator are connected in series and the first pushing direction is opposite to the second pushing direction,
wherein the first cylinder actuator is disposed between the fixed frame and the second cylinder actuator, and the second cylinder actuator is disposed between the first cylinder actuator and the flexible frame.

2. The canopy of claim 1 wherein the first cylinder actuator and the second cylinder actuator are parallel to each other.

3. A passenger boarding bridge comprising the canopy of claim 1.

4. The canopy of claim 1 wherein the first cylinder actuator and the second cylinder actuator are fixedly connected to each other by a common frame or a closed housing.

5. The canopy of claim 4 wherein the common frame has a main extension direction with a length along a mean pushing direction.

6. The canopy of claim 4, wherein the first cylinder actuator has a first cylinder and a first rod and the second cylinder actuator has a second cylinder and a second rod, wherein the first rod and the second rod are each transferable between an extracted state and a retracted state.

7. The canopy of claim 6 wherein the first rod and the second rod are both fixed at a respective frame side end at the common frame.

8. The canopy of claim 6 wherein in an extracted state of the cylinder actuators each cylinder is at least partially accommodated within the common frame.

9. The canopy of claim 6, wherein, in an extracted state of the cylinder actuators, each cylinder is at least partially accommodated within the closed housing.

* * * * *